US009536496B2

(12) United States Patent
Youn et al.

(10) Patent No.: US 9,536,496 B2

(45) Date of Patent: Jan. 3, 2017

(54) IMAGE PROCESSING APPARATUS, DISPLAY APPARATUS, AND IMAGE PROCESSING SYSTEM AND METHOD, FOR DISPLAYING IMAGE DATA

(71) Applicant: SAMSUNG ELECTRONICS CO., LTD., Suwon-si (KR)

(72) Inventors: Su-jin Youn, Suwon-si (KR); Sung-ju Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 44 days.

(21) Appl. No.: 14/563,189

(22) Filed: Dec. 8, 2014

(65) Prior Publication Data

US 2015/0243248 A1 Aug. 27, 2015

(30) Foreign Application Priority Data

Feb. 21, 2014 (KR) ........................ 10-2014-0020713

(51) Int. Cl.

| | |
|---|---|
| ***G09G 5/02*** | (2006.01) |
| ***G09G 5/06*** | (2006.01) |
| ***G06T 5/00*** | (2006.01) |
| ***G06T 5/40*** | (2006.01) |
| ***G06T 7/00*** | (2006.01) |
| ***H04N 1/60*** | (2006.01) |
| ***H04N 5/57*** | (2006.01) |

(52) U.S. Cl.

CPC ........ *G09G 5/02* (2013.01); *G09G 2320/0666* (2013.01); *G09G 2340/06* (2013.01); *G09G 2370/022* (2013.01)

(58) Field of Classification Search

CPC combination set(s) only.

See application file for complete search history.

(56) References Cited

U.S. PATENT DOCUMENTS

| | | | | |
|---|---|---|---|---|
| 2009/0296110 | A1* | 12/2009 | Mestha | H04N 1/00957 358/1.9 |
| 2010/0183225 | A1* | 7/2010 | Vantaram | G06T 7/0081 382/173 |
| 2013/0150322 | A1* | 6/2013 | Paufique | A61K 8/73 514/54 |
| 2013/0321873 | A1* | 12/2013 | Ido | G06K 15/1878 358/3.27 |
| 2014/0240340 | A1* | 8/2014 | Shirasawa | H04N 1/6058 345/590 |
| 2015/0030244 | A1* | 1/2015 | Robles-Kelly | H04N 1/6058 382/165 |

* cited by examiner

*Primary Examiner* — Wesner Sajous

(74) *Attorney, Agent, or Firm* — Sughrue Mion, PLLC

(57) ABSTRACT

An image processing apparatus, a display apparatus, and an image processing system and method, for displaying image data, are provided. The image processing apparatus includes a color gamut converter configured to convert a color gamut of at least a portion of an image received from the display apparatus, a controller configured to control the color gamut converter to convert color gamut of at least the portion of the image data based on region division information of a display image received from the display apparatus through the communicator and profile information for converting color gamut of a plurality of divided regions based on the region division information. Thus, the display apparatus displays image data converted into multiple-color gamut without an additional component for converting image quality and color gamut of the image data.

22 Claims, 7 Drawing Sheets

IMAGE PROCESSING APPARATUS, DISPLAY APPARATUS, AND IMAGE PROCESSING SYSTEM AND METHOD, FOR DISPLAYING IMAGE DATA

CROSS-REFERENCE TO RELATED APPLICATION(S)

This application claims priority from Korean Patent Application No. 10-2014-0020713, filed on Feb. 21, 2014 in the Korean Intellectual Property Office, the disclosure of which is incorporated herein by reference in its entirety.

BACKGROUND

1. Field

Apparatuses and methods consistent with exemplary embodiments relate to image processing, and more particularly, to an image processing apparatus, a display apparatus, an image processing system and method, for displaying image data converted into a multiple-color gamut.

2. Description of Related Art

In general, a display apparatus may store information for converting a color gamut of an image displayed on a screen into a color gamut desired by a user. The information may be generated based on a measurement value of an image quality of the image displayed on the screen.

The display apparatus may convert the color gamut and an image quality of the image data displayed on the screen based on pre-stored information and display the image in which the color gamut and the image quality are converted based on the information.

However, a related art display apparatus requires at least two components (hereinafter, referred to as an image quality correction chip) in order to convert image data into a multi-color gamut. That is, the related art display apparatus must include at least M image quality correction chips in order to convert a color gamut of M regions of the same image. For example, if an image has three regions, a related art display apparatus requires at least three image quality correction chips to convert a respective color gamut of the three regions.

SUMMARY

Exemplary embodiments overcome the above disadvantages and other disadvantages not described above. Also, exemplary embodiments are not required to overcome the disadvantages described above, and an exemplary embodiment may not overcome any of the problems described above.

Exemplary embodiments provide a display apparatus for displaying image data converted into a multiple-color gamut without an additional component for converting image quality and color gamut of the image data.

According to an aspect of an exemplary embodiment, there is provided an image processing apparatus including a color gamut converter configured to convert a color gamut of an image received from a display apparatus, a controller configured to control the color gamut converter to divide the image and convert a color gamut of at least a portion of the divided image based on region division information for dividing the image and profile information for converting a color gamut of at least a portion of the divided image, which are received from the display apparatus, and a communicator configured to transmit information about the converted image to the display apparatus.

The controller may divide the image into a plurality of regions based on the region division information of the image received from the display apparatus.

The color gamut converter may adjust pixel values of the respective regions based on the profile information corresponding to each of the plurality of regions to convert the color gamut of each region.

In response to the image data being divided into a first region and a second region, the color gamut converter may apply the pixel value of the first region to a color gamut conversion formula included in first profile information corresponding to the first region to convert a color gamut of the first region, and apply the pixel value of the second region to a color gamut conversion formula included in second profile information corresponding to the second region to convert a color gamut of the second region.

At least one of the first region and the second region may be a region selected by a user command.

The controller may convert a color gamut of at least two regions of the divided image based on respective profile information for each of the at least two regions.

According to an aspect of another exemplary embodiment, there is provided a display apparatus including a communicator configured to communicate with an image processing apparatus, a display configured to display an image received from the image processing apparatus, a storage configured to store profile information for converting a color gamut of the image, and a controller configured to control the communicator to transmit, to the image processing apparatus, region division information for dividing the image and profile information for converting a color gamut of at least a portion of the divided image, according to a user command.

The region division information may include first region information about a first region of the divided image and second region information about a second region of the divided image, and the profile information may include at least one of first profile information for converting a color gamut of the first region and second profile information for converting a color gamut of the second region.

The first and second profile information may include a color gamut conversion formula for adjusting pixel values of the first and second regions, respectively.

In response to receiving information for converting a color gamut of a plurality of regions of the divided image from the image processing apparatus, the controller may correct a color deviation of the plurality of regions based on the color gamut information, and display the converted image through the display.

According to an aspect of another exemplary embodiment, there is provided an image processing method of an image processing apparatus, the image processing method including receiving an image from a display apparatus, receiving region division information for dividing the image and profile information for converting a color gamut of the image, from the display apparatus, dividing the image and converting a color gamut of at least a portion of the divided image based on the received region division information and profile information, and transmitting information about the converted image to the display apparatus.

The dividing may include dividing the image data into a plurality of regions based on the region division information received from the display apparatus.

The converting may include adjusting pixel values of the respective regions based on the profile information corresponding to each of the plurality of regions to convert a color gamut of each region.

The converting may include, in response to the image data being divided into a first region and a second region, applying a pixel value of the first region to a color gamut conversion formula included in first profile information corresponding to the first region to convert a color gamut of the first region, and applying a pixel value of the second region to a color gamut conversion formula included in second profile information corresponding to the second region to convert a color gamut of the second region.

At least one of the first region and the second region may be a region selected by a user command.

The converting may include converting a color gamut of at least two regions of the divided image based on respective profile information for each of the at least two regions.

According to an aspect of another exemplary embodiment, there is provided a method of displaying image data by a display apparatus, the method including displaying an image, receiving a user command for converting a color gamut of at least a portion of the image, and transmitting, to the image processing apparatus, region division information for dividing the image and profile information for converting a color gamut of at least a portion of the divided image, according to a user command.

The region division information may include first region information about a first region of the image and second region information about a second region of the image, and the profile information may include at least one of first profile information for converting a color gamut of the first region and second profile information for converting a color gamut of the second region.

The first and second profile information may include a color gamut conversion formula for adjusting pixel values of the first and second regions.

The method may further include, in response to receiving information for converting a color gamut of a plurality of regions of the image from the image processing apparatus, correcting a color deviation of the plurality of regions based on the color gamut information, and displaying the converted image through the display.

According to an aspect of another exemplary embodiment, there is provided an image processing system including an image processing apparatus configured to transmit image data to a display apparatus, and a display apparatus configured to transmit, to the image processing apparatus, region division information for dividing an image and profile information for converting a color gamut of at least a portion of the divided image, according to a user command, wherein the image processing apparatus divides the image into a plurality of regions based on the received region division information, converts a color gamut for one or more of the plurality of regions based on profile information corresponding to each of the plurality of regions, and transmits the converted image to the display apparatus.

In response to receiving information for converting a color gamut of the plurality of regions from the image processing apparatus, the display apparatus may correct a color deviation of the plurality of regions, and display the converted image through a display screen

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
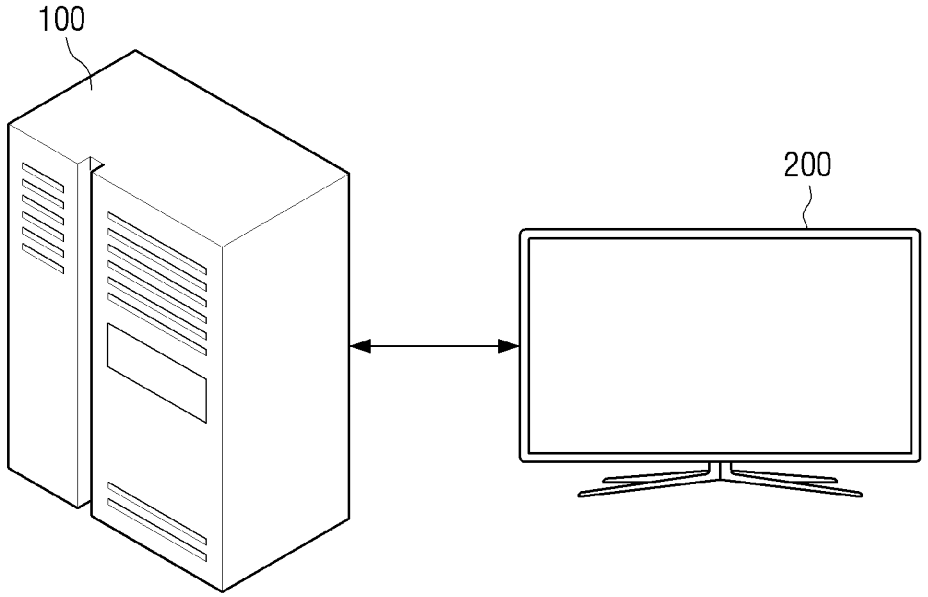
FIG. 1 is a block diagram of an image processing system according to an exemplary embodiment.

Certain exemplary embodiments will now be described in greater detail with reference to the accompanying drawings. Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

Figure 2:
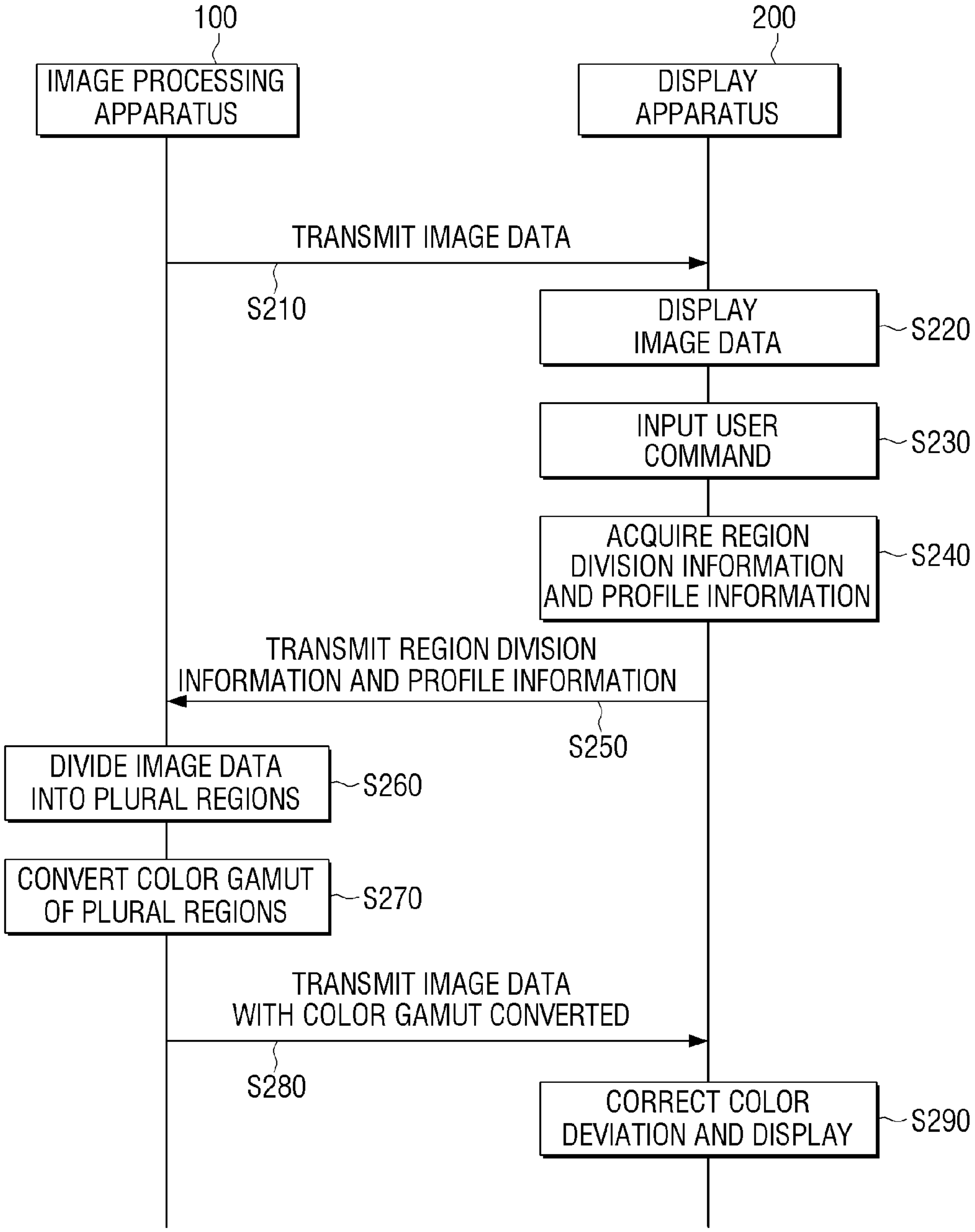
FIG. 2 is a diagram illustrating a process of displaying image data, a color of which is corrected, by the image processing system according to an exemplary embodiment.

FIG. 1 is a block diagram of an image processing system according to an exemplary embodiment. FIG. 2 is a diagram illustrating a process of displaying image data, a color of which is corrected, by the image processing system according to an exemplary embodiment.

As illustrated in FIG. 1, the image processing system includes an image processing apparatus 100 and a display apparatus 200. For example, the image processing apparatus 100 may be a terminal apparatus such as a personal computer (PC), a server, a camera, and the like, which image-processes pre-stored image data or image data received from a content providing server and transmits the image processed image data to the display apparatus 200. As another example, the image processing apparatus 100 may be a wireless communication terminal apparatus such as a smart phone, a tablet, a laptop, and the like, and may transmit the image processed image data to the display apparatus 200 via wireless communication. That is, the image processing apparatus 100 may be a terminal that is capable of communicating with the display apparatus 200 by wired or wireless communication and is capable of image processing pre-stored image data and image data received from the content providing server.

The display apparatus 200 includes an output apparatus such as a monitor and displays image data that is received from the image processing apparatus 100 on a screen of the monitor. Like the image processing apparatus 100, the display apparatus 200 may receive image data from the image processing apparatus 100 by wired or wireless communication and may be a terminal for displaying the received image data on the screen. For example, the display apparatus 200 may be television, a set-top box, a computer, a tablet, a mobile phone, an appliance, and the like.

Referring to FIG. 2, the image processing apparatus 100 image-processes pre-stored image data or image data received from a content providing server requested by a user.

The image processing apparatus processes the data into a form capable of being output by the display apparatus 200 and transmits the image-processed image data to the display apparatus 200 (S210). In response, the display apparatus 200 displays the image data received from the image processing apparatus 100 on the display screen (S220).

The display apparatus 200 may receive a user command for color correction of currently displayed image data from the user while displaying the image data received from the image processing apparatus 100 (S230). For example, the user may select an image region to convert a color gamut of a portion of the image data displayed on the screen of the display apparatus 200. In addition, the user may select profile information for converting a color gamut of a portion of the image displayed on a pre-selected image region into specific color gamut with reference a plurality of pieces of profile information pre-stored in the display apparatus 200.

According to the user command, the display apparatus 200 generates region division information for dividing a display image, acquires the generated region division information and profile information selected by the user, and transmits the region division information and the profile information to the image processing apparatus 100 (S240 and S250). For example, the region division information may indicate an image region (hereinafter, referred to as a divided image) for displaying a region for conversion of a color gamut of the region of the image as a coordinate value or values. In addition, the profile information may include information for converting a color gamut of a portion of an image displayed on the screen and may include a color gamut conversion formula.

For example, a color gamut may be a predefined color space or a region in which color is capable of being expressed via an RGB or CMY scheme by the display apparatus 200. Thus, the profile information may be information for correcting or otherwise adjusting the color on a partial area or on an entire area of an image to a desired color gamut. For example, the image processing apparatus 100 may change or correct the color of a displayed image to a color that the display apparatus 200 is not capable of generating on its own.

Upon receiving the region division information and the profile information from the display apparatus 200, the image processing apparatus 100 divides the image into a plurality of regions based on the region division information (S260). Then the image processing apparatus 100 converts a color gamut of each region or one or more regions into a respective color gamut based on the profile information corresponding to the respective region and transmits the image data including a color gamut converted for each respective region, to the display apparatus 200 (S270 and S280).

Upon receiving the image data, the display apparatus 200 corrects or otherwise adjusts a color deviation generated according to the color gamut conversion for each region and displays the image (S290). For example, the display apparatus may convert the color gamut of each region in consideration of the characteristics of a panel of the screen of the display apparatus 200.

In the image processing system according to exemplary embodiments, the display apparatus 200 may display an image in which a plurality of regions have a different color gamut, without using a plurality of image quality correction chips to convert respective regions of the image data into different color gamut.

Hereinafter, examples of the aforementioned image processing apparatus 100 and display apparatus 200 are described.

Figure 3:
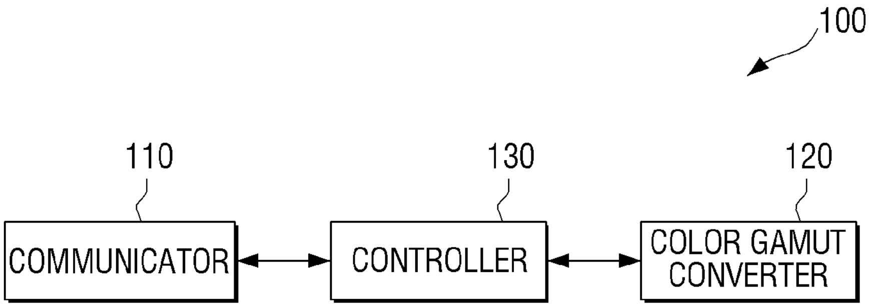
FIG. 3 is a block diagram of an image processing apparatus according to an exemplary embodiment.

FIG. 3 is a block diagram of the image processing apparatus 100 according to an exemplary embodiment.

As illustrated in FIG. 3, the image processing apparatus 100 includes a communicator 110, a color gamut converter 120, and a controller 130. It should be appreciated that the image processing apparatus 100 may further include additional components for performing image processing but they are omitted here for brevity.

The communicator 110 communicates with the display apparatus 200 by wired or wireless communication to transmit image data requested by a user to the display apparatus 200. In addition, the communicator 110 may communicate with a content providing apparatus (not shown) by wired or wireless communication to receive the image data requested by the user.

For example, the communicator 110 may include various communication modules such as a wireless communication module, a short distance wireless communication module for wireless communication, an interface module (not shown) that communicates with the display apparatus 200 by wire to transmit image data, and the like. The short distance wireless communication module may be used to communicate with an external device positioned within a short distance according to a scheme such as Bluetooth, Zigbee, and the like. The wireless communication module may connect to an external network and perform communication according to a wireless communication protocol such as WiFi, IEEE, and the like. The wireless communication module may further include a mobile communication module that accesses a mobile communication network and performs communication according to various mobile communication standards such as 3$^{rd}$ generation (3G), 3$^{rd}$ generation partnership project (3GPP), long term evolution (LTE), and the like. In addition, the communicator 110 may communicate with a content providing apparatus through the Internet to receive image data.

The color gamut converter 120 converts a color gamut of at least a portion of an image data. For example, the controller 130 may control the color gamut converter 120 to convert a color gamut of at least a portion of the image based on the profile information and region division information of the display image received through the communicator 110. The region division information may indicate or otherwise identify an image region (hereinafter, referred to as a divided image region) for conversion of a color gamut of the image using a coordinate value. In addition, the profile information may include information for converting a color gamut of the divided image region into a specific color gamut and also include a color gamut conversion formula.

For example, upon receiving the region division information and the profile information from the display apparatus 200 through the communicator 110, the controller 130 may divide the image into a plurality of regions based on the received region division information. That is, the controller 130 may divide the image into a plurality of regions based on one or more coordinate values contained in the region division information. Likewise, when the image data is divided into a plurality of regions, the controller 130 may control the color gamut converter 120 to convert a color gamut of each of the regions based on the profile information corresponding to each respective region. According to the control command, the color gamut converter 120 may adjust pixel values of the respective regions based on the profile information corresponding to each region divided based on the region division information to convert a color gamut of each of the plurality of regions.

As an example, the controller 130 may divide the image into first and second regions based on the region division information. One of the first and second regions may be selected by a user command. As described above, the user may select an image region for displaying a corresponding region to convert a color gamut of the image region displayed on the screen of the display apparatus 200. In this case, a portion of image data displayed on the selected image region is the first region and the remaining portion is the second region.

The color gamut converter 120 applies a pixel value of the first region to the color gamut conversion formula based on first profile information of the received profile information, corresponding to the first region, to convert a color gamut of the first region. In addition, the color gamut converter 120 applies a pixel value of the second region to the color gamut conversion formula based on second profile information of the received profile information, corresponding to the second region, to convert a color gamut of the second region. The color gamut conversion formula contained in the first and second profile information may include an algorithm for adjusting pixel values for displaying the respective image corresponding to the first and second regions.

For example, the color gamut conversion formula contained in the first profile information may be an algorithm for converting the color gamut into a first color and the color gamut conversion formula contained in the second profile information may be an algorithm for converting color gamut into a second color. In this case, the color gamut converter 120 may adjust a pixel value associated with the first color of the pixel value of the first region using the color gamut conversion formula included in the first profile information and adjust a pixel value associated with the second color of the pixel value of the second region using the color gamut conversion formula included in the second profile information. Thus, the color gamut of the first region, associated with the first color, and color gamut of the second region, associated with the second color, may be converted into color gamut in which a deeper color or a shallower color is expressed.

When the color gamut of each region is converted via the color gamut converter 120, the communicator 110 transmits image data including the converted color gamut of each respective region to the display apparatus 200. Accordingly, the display apparatus 200 may correct color deviation generated according to the color gamut conversion for each region in consideration of the characteristics of a panel of the screen for displaying the image. Furthermore, the corrected image may be displayed by the display apparatus 200.

Hereinafter, components of the display apparatus 200 according to exemplary embodiments are described.

Figure 4:
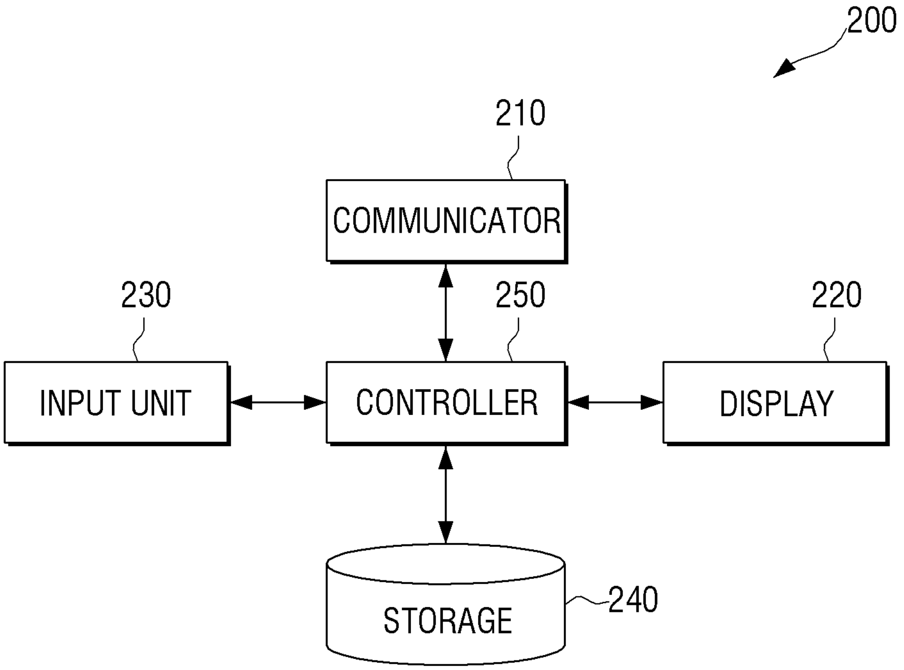
FIG. 4 is a block diagram of a display apparatus according to an exemplary embodiment.

FIG. 4 is a block diagram of the display apparatus 200 according to an exemplary embodiment.

As illustrated in FIG. 4, the display apparatus 200 includes a communicator 210, a display 220, an input unit 230, a storage 240, and a controller 250.

The communicator 210 communicates with the image processing apparatus 100 by wired or wireless communication to receive image data requested by a user. During wired communication with the image processing apparatus 100, the communicator 210 may further include an interface module for receiving image data from the image processing apparatus 100. The communicator 210 may include a communication module such as that described with respect to the communicator 110 of FIG. 3. Accordingly, the communicator 110 of the image processing apparatus 100 may transmit and receive data to and from the communicator 210 of the display apparatus 200.

In addition, the communicator 210 may further include an infrared ray communication module for communicating with a remote control apparatus. In this case, the communicator 210 may communicate with the remote control apparatus (not shown) to receive a user command.

The display 220 displays image data that is received from the image processing apparatus 100 through the communicator 210 on a screen. In addition, the display 220 may display a web search result received from the web server on the screen. The display 220 may include a touchscreen or a touch pad or a display panel that is capable of detecting user touch input. In addition, the display 220 may include a cathode ray tube (CRT), a liquid crystal display (LCD), a thin film transistor liquid crystal display (TFT-LCD), a plasma display panel (PDP), a flexible display, a head mounted display (HMD), and the like.

The input unit 230 may include various input components that receive a control command or a selection command according to various user manipulations and transmits the control command or the selection command to the controller 250. For example, the input unit 230 may include a touch input component such as the aforementioned touch screen or touch pad, a key input component such as a key pad including various functional keys, number keys, character keys, a speech recognition component for receiving vocal commands, a camera for receiving user gesture commands such as with a user's hands, and the like.

The storage 240 stores at least one piece of profile information for conversion of color gamut of at least a portion of the image displayed on the screen. For example, the profile information may be information for converting a color gamut of a portion of the image into a specific color gamut and may include a color gamut conversion formula.

The storage 240 may additionally store various programs, and the like, which may be used to operate the display apparatus 200. For example, the storage 240 may include a read only memory (ROM) for storing a program for executing an operation of the controller 250, a random access memory (RAM) for temporarily storing various data according to execution of an operation of the controller 250, an electrically erasable and programmable ROM (EEPROM) for storing various reference data, and the like.

The controller 250 controls the communicator 210 to transmit, to the image processing apparatus 100, region division information for dividing a display image according to a user command. The user command may be received or input through at least one of the communicator 210 and the input unit 230, or profile information for converting a color gamut of a portion of image data displayed through the display 220. The communicator 210 may transmit the region division information for dividing the display image and the profile information for converting the color gamut of a portion of the displayed image data to the image processing apparatus 100. For example, the profile information may include a plurality of pieces of profile information that are pre-stored in the storage 240, and which may be used for converting the color gamut of a portion of a divided image selected by a user.

Upon receiving a control command for dividing the displayed image, the controller 250 acquires a coordinate value for dividing the displayed image based on the input control command. Then the controller 250 may generate region division information about the divided image by dividing the displayed image based on the acquired coordinate value.

For example, upon receiving a control command for displaying a first region of the image displayed on the screen, the controller 250 may generate the region division information including first region information about a divided image for displaying the first region and second region information about the divided image for displaying the second region, based on the input control command.

The controller 250 may acquire profile information including at least one of a first profile information for converting a color gamut of the first region and second profile information for converting a color gamut of the second region of the image displayed with reference to the storage 240, according to a user selection command. For example, the first and second profile information may include a color gamut conversion formula for adjusting pixel values of the first and second regions of the image displayed on the respective division images associated with the region division information.

Upon receiving region division information and profile information of the displayed image from the display apparatus 200, the image processing apparatus 100 may divide the image to be transmitted to the display apparatus 200 into a plurality of regions, for example, first and second regions based on the region division information. Then the image processing apparatus 100 converts a color gamut of at least one of the first and second regions based on the profile information and transmits the image with the converted color gamut to the display apparatus 200.

For example, the profile information may include the first and second profile information for converting a color gamut of each of the first and second regions. Accordingly, the image processing apparatus 100 may convert the color gamut of the first and second regions of the image based on the first and second profile information corresponding to the respective first and second regions and transmit the image with the converted color gamut of each respective region, to the display apparatus 200. As another example, if the profile information includes the first profile information about the first region among the first and second regions, the image processing apparatus 100 may convert the color gamut of the first region only based on the first profile information.

Upon receiving the image data in which the color gamut is converted for one or more respective regions of the image based on the region division information and profile information, the controller 250 corrects a color deviation of the one or more regions, and displays corrected image through the display 220.

For example, the controller 250 may correct the color deviation generated according to the color gamut conversion for each region in consideration of the characteristics of a panel included in the display 220. Thus, the display 220 may display the image data in which a color gamut is converted for each respective region and image quality of which is corrected for an entire region.

Figure 5:
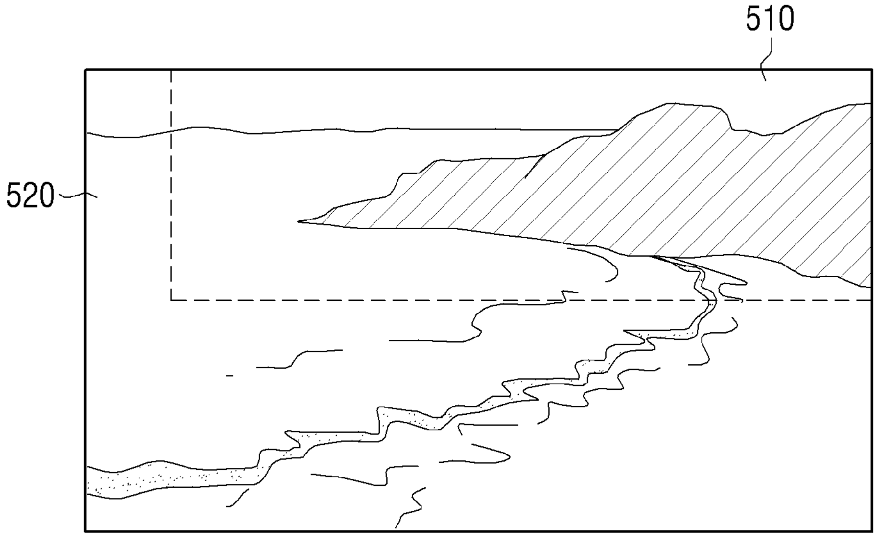
FIG. 5 is a diagram illustrating a display apparatus that displays image data, a color gamut of which is converted for each respective region, according to an exemplary embodiment.

FIG. 5 is a diagram illustrating an example in which the display apparatus 200 displays an image data in which the color gamut is converted for each respective region according to an exemplary embodiment.

As illustrated in FIG. 5, the display apparatus 200 divides an image into a first divided image 510 and a second divided image 520 according to a user command. For example, the first divided image 510 of the first and second division images 510 and 520 may be an image region in which a color gamut is converted based on profile information selected by the user.

The display apparatus 200 may transmit region division information associated with the first and second division 510 and 520 and profile information selected in relation to the first division image 510 to the image processing apparatus 100. In response, the image processing apparatus 100 divides the image into the first and second regions based on the received region division information. Then the image processing apparatus 100 adjusts a pixel value of the first region based on the received profile information to convert a color gamut of the first region. Then the image processing apparatus 100 transmit image data of the first region in which the color gamut is converted, and image data of the second region in which the color gamut is not converted, to the display apparatus 200. In response, the display apparatus 200 corrects a color deviation between the first region and the second region according to a color gamut conversion of the first region. Thus, an image in which the overall image quality is corrected may be displayed. In this example, the display apparatus 200 may display slashes or other indicators identifying or otherwise distinguishing that a color gamut of the first region is different from a color gamut of the second region.

Thus far, components of the image processing apparatus 100 and display apparatus 200 included in the image processing system according to exemplary embodiments have been described. Hereinafter, examples of an image processing method and a method of displaying an image according to exemplary embodiments will be described in detail.

Figure 6:
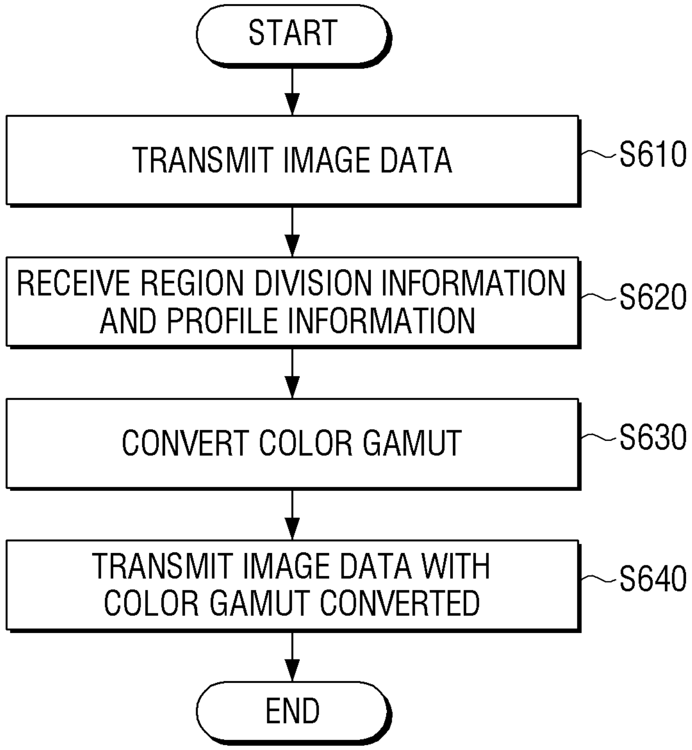
FIG. 6 is a flowchart of an image processing method of an image processing apparatus according to an exemplary embodiment.

FIG. 6 is a flowchart of an image processing method of an image processing apparatus according to an exemplary embodiment.

As illustrated in FIG. 6, the image processing apparatus 100 transmits content of image data requested by a user to the display apparatus 200 (S610). Next the image processing apparatus 100 receives region division information of a displayed image and profile information for conversion of the color gamut of the image from the display apparatus 200 (S620). Next, the image processing apparatus 100 converts a color gamut of at least a portion of the image based on the received region division information and profile information (S630). Then the image processing apparatus 100 transmit image data in which a color gamut is converted for at least the portion, to the display apparatus 200 (S640).

In response to receiving region division information and profile information from the display apparatus 200, the image processing apparatus 100 divides image data to be transmitted to the display apparatus 200 into a plurality of regions based on the region division information of the received information Likewise, when the image data is divided into the plurality of regions based on the region division information, the image processing apparatus 100 may adjust pixel values of the respective regions based on profile information corresponding to each region to convert a color gamut of each region.

In some exemplary embodiments, the image processing apparatus 100 may divide the image data to be transmitted to the display apparatus 200 into first and second regions, based on the region division information. At least one of the first and second regions may be regions selected by a user command. The image processing apparatus 100 may apply a pixel value of the first region to a color gamut conversion formula contained in first profile information corresponding to the first region to convert the color gamut of the first region. In addition, the image processing apparatus 100 may apply a pixel value of the second region to a color gamut conversion formula contained in second profile information corresponding to the second region to convert a color gamut of the second region.

For example, the color gamut conversion formula of the first and second profile information may include an algorithm for adjusting pixel values for displaying respective image regions corresponding to the first and second regions. Accordingly, the image processing apparatus 100 may convert the pixel values of the first and second regions via the color gamut conversion formula contained in the profile information to convert the color gamut of the first and second regions. The image processing apparatus 100 transmits image data in which the color gamut is converted for each respective region, to the display apparatus 200. Thus, the display apparatus 200 may correct a color deviation generated according to the color gamut conversion for each region. Accordingly, the display apparatus 200 may display a corrected image obtained by correcting the image quality for an entire image of image or part of an image, on a display screen.

Figure 7:
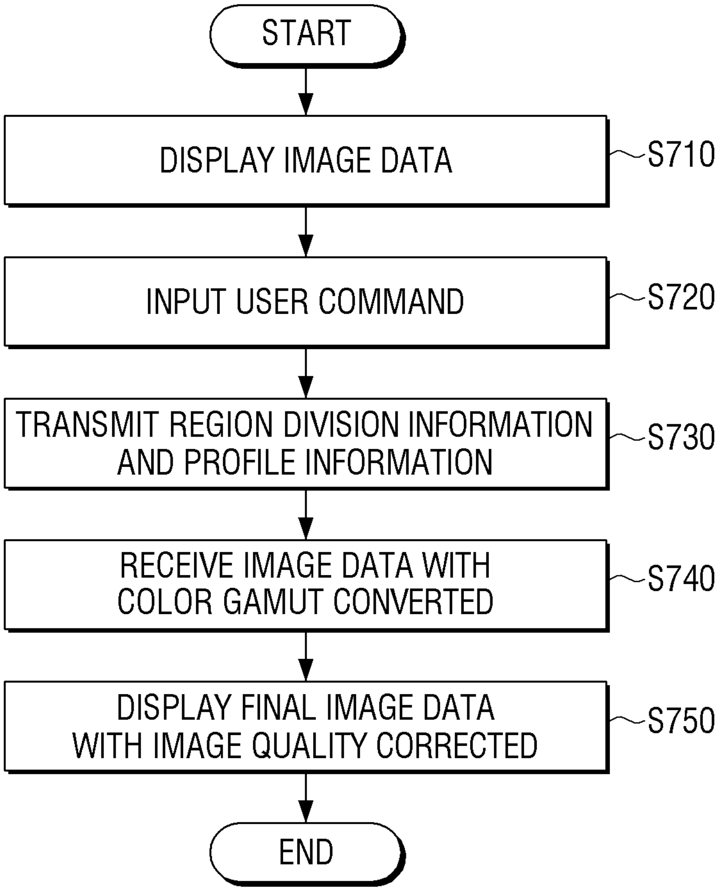
FIG. 7 is a flowchart of a method of displaying image data by a display apparatus according to an exemplary embodiment.

FIG. 7 is a flowchart of a method of displaying image data by the display apparatus 200 according to an exemplary embodiment.

As illustrated in FIG. 7, the display apparatus 200 receives image data requested by a user from the image processing apparatus 100 and displays the image data on a display screen (S710). While displaying the image, the display apparatus 200 receives a color gamut conversion related user command for the corresponding image (S720), and the display apparatus 200 transmits region division information for dividing the displayed image and profile information for converting a color gamut of at least a portion of the image to the image processing apparatus 100 according to the input user command (S730).

For example, in response to receiving a user command for dividing the displayed image, the display apparatus 200 may obtain coordinate values for dividing the displayed image based on the input user command. Then the display apparatus 200 may generate the region division information including region information about the image obtained by dividing the image based on the obtained coordinate value. That is, the display apparatus 200 may generate the region division information including first region information and second region information about a remaining region except for the first region of the image data, based on the obtained coordinate values.

Then the display apparatus 200 may acquire profile information including at least one of first profile information for converting a color gamut of the first region and second profile information for converting a color gamut of the second region from a plurality of pre-stored pieces of profile information based on the user command. For example, the first and second profile information may include the color gamut conversion formula for adjustment of pixel values of the first and second regions.

Thus, the image processing apparatus 100 may divide the image into a plurality of regions, for example, the first and second regions based on the region division information received from the display apparatus 200. Then the image processing apparatus 100 may adjust the pixel values of the first and second pixel values using the color gamut conversion formula contained in the profile information received from the display apparatus 200 to convert a color gamut of the first and second regions. The image processing apparatus 100 transmits the image data including the color gamut which is converted for each respective region, to the display apparatus 200. In response, the display apparatus 200 receives the image data from the image processing apparatus 100 (S740).

Upon receiving image data, the display apparatus 200 corrects a color deviation between the first and second regions using the converted color gamut. Then the display apparatus 200 displays a final image obtained by correcting image quality with respect to an entire image according to color deviation correction on a display screen (S750).

For example, in response to receiving the image data including a color gamut which is converted for each of the first and second regions, the display apparatus 200 may correct a color deviation generated according to the color gamut conversion for each of the first and second regions based on characteristics of a panel of the display screen. Thus, the display apparatus 200 may display final image data obtained by correcting image quality for an entire image of image data on the display screen.

According to the aforementioned various exemplary embodiments, a display apparatus may display image data converted into a multiple-color gamut without an additional component for converting the image quality and the color gamut of the image data.

The methods described above can be written as a computer program, a piece of code, an instruction, or some combination thereof, for independently or collectively instructing or configuring a processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The foregoing exemplary embodiments and advantages are merely exemplary and are not to be construed as limiting the inventive concept. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image processing apparatus comprising:
a communicator configured to receive an image from a contents providing server;
a color gamut converter configured to convert a color gamut of the image; and
a controller configured to:
process an image received from the contents providing server and transmit the image to a display apparatus, and
in response to region division information to divide the image and profile information to convert a color gamut of at least a region divided by the region division information being received from the display apparatus, control the color gamut converter to convert a color gamut of at least a portion of the image based on the region division information and the profile information and control the communicator transmit the converted image to the display apparatus.

2. The image processing apparatus as claimed in claim 1, wherein the controller is configured to divide the image into a plurality of regions based on the region division information of the image received from the display apparatus.

3. The image processing apparatus as claimed in claim 2, wherein the color gamut converter is configured to adjust pixel values of the respective regions based on the profile information corresponding to each of the plurality of regions to convert the color gamut of each region.

4. The image processing apparatus as claimed in claim 1, wherein the color gamut converter is configured to, in response to the image being divided into a first region and a second region, apply a pixel value of the first region to a color gamut conversion formula included in first profile information corresponding to the first region to convert a color gamut of the first region, and apply a pixel value of the second region to a color gamut conversion formula included in second profile information corresponding to the second region to a convert color gamut of the second region.

5. The image processing apparatus as claimed in claim 4, wherein at least one of the first region and the second region is a region selected by a user command.

6. The image processing apparatus of claim 1, wherein the controller is configured to convert a color gamut of at least two regions of the divided image based on respective profile information for each of the at least two regions.

7. A display apparatus comprising:
a communicator configured to receive an image from an image processing apparatus;
a display configured to display the received image;
a controller configured to:
control the communicator to generate region division information to divide the image, acquire profile information to convert a color gamut of at least one portion divided by the region division information, and transmit the region division information and the profile information to the image processing apparatus, according to a user's command, and
in response to an image of which a color gamut of at least a portion of the image is converted based on the region division information and the profile information being received from the image processing apparatus, display on the display the image of which the color gamut of the at least the portion is changed.

8. The display apparatus as claimed in claim 7, wherein:
the region division information comprises first region information about a first region of the divided image and second region information about a second region of the divided image; and
the profile information comprises at least one of first profile information for converting a color gamut of the first region and second profile information for converting a color gamut of the second region.

9. The display apparatus as claimed in claim 8, wherein the first and second profile information comprises a color gamut conversion formula for adjusting pixel values of the first and second regions, respectively.

10. The display apparatus as claimed in claim 7, wherein, in response to receiving information for converting a color gamut of a plurality of regions of the divided image from the image processing apparatus, the controller is configured to correct a color deviation of the plurality of regions based on the color gamut information, and display the converted image through the display.

11. An image processing method in an image processing apparatus including a controller and a color gamut converter, the method comprising:
receiving an image from a contents providing server;
processing, by the controller, the received image and transmitting the image to the display apparatus;
receiving, from the display apparatus, region division information to divide the image and profile information to convert a color gamut of at least a portion divided by the region division information;
converting, by the color gamut converter, a color gamut of at least a portion of the image based on the region division information and the profile information; and
transmitting, to the display apparatus, the image of which the color gamut of the at least the portion is converted.

12. The method as claimed in claim 11, further comprising dividing the image into a plurality of regions based on the region division information received from the display apparatus.

13. The method as claimed in claim 12, wherein the converting comprises adjusting pixel values of the respective regions based on the profile information corresponding to each of the plurality of regions to convert the color gamut of each region.

14. The method as claimed in claim 11, wherein the converting comprises, in response to the image being divided into a first region and a second region, applying a pixel value of the first region to a color gamut conversion formula included in first profile information corresponding to the first region to convert a color gamut of the first region, and applying a pixel value of the second region to a color gamut conversion formula included in second profile information corresponding to the second region to convert color gamut of the second region.

15. The method as claimed in claim 14, wherein at least one of the first region and the second region is a region selected by a user command.

16. The method of claim 11, wherein the converting comprises converting a color gamut of at least two regions of the divided image based on respective profile information for each of the at least two regions.

17. An image displaying method in a display apparatus including a controller, the method comprising:
receiving an image from an image processing apparatus;
displaying the received image;
receiving a user command to convert a color gamut of at least a portion of the image;

generating, by the controller, region division information to divide the image, and acquiring profile information to convert a color gamut of at least a portion divided by the region division information, according to the user's command;

transmitting the region division information and the profile information to the image processing apparatus;

receiving, from the image processing apparatus, an image of which a color gamut of the at least a portion is changed based on the region division information and the profile information; and displaying the image of which the color gamut of the at least the portion is converted.

18. The method as claimed in claim 17, wherein:

the region division information comprises first region information about a first region of the divided image and second region information about a second region of the divided image; and the profile information comprises at least one of first profile information for converting a color gamut of the first region and second profile information for converting a color gamut of the second region.

19. The method as claimed in claim 18, wherein the first and second profile information comprises a color gamut conversion formula for adjusting pixel values of the first and second regions, respectively.

20. The method as claimed in claim 17, further comprising, in response to receiving information for converting a color gamut of a plurality of regions of the divided image from the image processing apparatus, correcting a color deviation of the plurality of regions based on the color gamut information, and displaying the converted image through a display.

21. An image processing system comprising:

an image processing apparatus configured to transmit image data to a display apparatus; and a display apparatus configured to generate region division information to divide the received image, acquire profile information to convert a color gamut of at least a portion of the region divided by the region division information, and transmit the information to the image processing apparatus, wherein the image processing apparatus is further configured to convert a color gamut of at least a portion of the image based on the received region division information and the profile information, and transmit, to the display apparatus, the image of which the color gamut of the at least the portion is converted.

22. The display apparatus as claimed in claim 21, wherein, in response to receiving information for converting a color gamut of the plurality of regions from the image processing apparatus, the display apparatus is configured to correct a color deviation of the plurality of regions, and display the corrected image through a display screen.

* * * * *